United States Patent [19]
Johnson

[11] 3,719,642
[45] March 6, 1973

[54] INTERMEDIATES FOR P-BENZAMIDE POLYMERS

[75] Inventor: Thomas Albert Johnson, Newark, Del.

[73] Assignee: E. I. du Pont de Nemours and Company, Wilmington, Del.

[22] Filed: April 20, 1971

[21] Appl. No.: 135,807

[52] U.S. Cl. ............260/78 A, 260/30.2, 260/30.6 R, 260/32.4, 260/32.6 N
[51] Int. Cl. .............................................C08g 20/20
[58] Field of Search......................................260/78 A

[56] References Cited

UNITED STATES PATENTS

| | | | |
|---|---|---|---|
| 3,225,011 | 12/1965 | Preston et al. | 260/78 |
| 3,541,056 | 11/1970 | Pikl | 260/78 |
| 3,631,101 | 12/1971 | Akl | 260/78 X |

FOREIGN PATENTS OR APPLICATIONS

| | | |
|---|---|---|
| 839,851 | 4/1970 | Canada |

OTHER PUBLICATIONS

Riesz, Rez–Facultad Humanidady Cienc–Montevideo, 2, No. 3, pp. 65–73 (1958).
Graf et al., J. Prakt. Chem. (2), 148, pp. 161–169 (1937).
Bredereck et al., Ber. 81, pp. 215–221 (1948).
Lorenz et al., "Makrom. Chem. 130," pp. 55–64 (1969).

*Primary Examiner*—Howard E. Schain
*Attorney*—Louis H. Rombach

[57] ABSTRACT

A composition consisting essentially of a hydrochloride of a nitrogen containing base compound in admixture with a compound or mixtures of compounds of the formula:

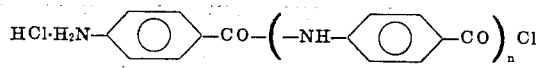

where $n$ is an integer of 1 to 50.

10 Claims, No Drawings

INTERMEDIATES FOR P-BENZAMIDE POLYMERS

BACKGROUND OF THE INVENTION

1. Field of the Invention

This invention relates to a new composition of matter which is useful for preparing high molecular weight p-benzamide polymers. More particularly, this invention relates to a composition consisting essentially of a hydrochloride of a nitrogen containing base compound and an active polymerizable substance or substances of the formula:

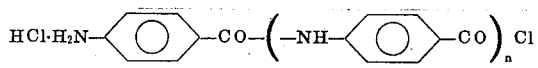

where $n$ is 1–50.

2. Prior Art

High molecular weight p-benzamide polymers are generally prepared by the polymerization of p-aminobenzoyl chloride hydrochloride, as described in French Pat. No. 1,526,745. The prior art procedures for obtaining p-benzamide polymers involve an indirect, cumbersome route from p-aminobenzoic acid, isolation and purification techniques to prepare the pure monomer, p-aminobenzoyl chloride hydrochloride. This monomer is obtained by treating p-aminobenzoic acid with thionyl chloride to produce p-thionylaminobenzoyl chloride according to the procedure of Graf and Langer, *J. Prakt. Chem.* 148, 161–169 (1937) and the thionylamino derivative produced is converted to p-aminobenzoyl chloride hydrochloride by reaction with anhydrous hydrogen chloride. Synthesis of p-thionylaminobenzoyl chloride by the non-catalytic procedure of Graf and Langer requires reaction temperatures which promote the formation of side reactions, thereby producing contaminants which, if not removed, are carried through to the polymers produced. Purification procedures for the p-thionylaminobenzoyl chloride are difficult. Lorenz and Mischk in *Makrom. Chem.* 130, 55–64 (1969) reported that p-thionylaminobenzoyl chloride decomposed when distillation was attempted. The conversion product, p-aminobenzoyl chloride hydrochloride, is relatively unstable and cannot be subjected to purification procedures. This problem is further compounded when attempts are made to manufacture p-aminobenzoyl chloride hydrochloride on a large scale for commercial production.

Furthermore, the p-aminobenzamidobenzoic acids of the formula $H_2N(C_6H_4CONH)_nC_6H_4COOH$, where $n$ is 1 to 3, used as starting materials for the preparation of the corresponding carbonyl chloride hydrochlorides, are obtained by a circuitous route via the condensation of p-nitrobenzoyl chloride with the appropriate p-aminobenzoic acid methyl ester as described by Bredereck and von Schuh in Ber. 81, 215–221 (1948).

The preparation of polymers of high molecular weight and satisfactory dopes depend upon the purity of the monomers. Pure monomers according to prior art procedures, are difficult to achieve. The monomer, p-aminobenzoyl chloride hydrochloride, has been polymerized by an anhydrous slurry technique (U.S. Pat. No. 3,225,011), giving a polymer of relatively low inherent viscosity. Solution polymerization of p-aminobenzoyl chloride hydrochloride, as described in Canadian Pat. No. 839,851, gives polymers of higher inherent viscosities. In order to prepare spin dopes, according to Canadian Pat. No. 839,851, the isolated polymer is dissolved in a suitable solvent with lithium chloride to produce a spinnable mixture. In U.S. Pat. No. 3,541,056, useful polymers from compounds of the formula:

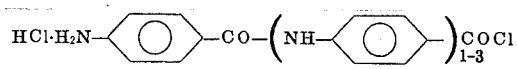

are obtained by adding a specified amount of lithium chloride to the polymerization reaction mixture to produce easily workable dopes for spinning fibers, casting films and coating substrates.

It is an object of this invention to provide a new composition that can be used to prepare high molecular weight p-benzamide polymers and dopes thereof. It is another object of this invention to provide a composition for the preparation of high molecular weight p-benzamide polymers which is easily filterable from the reaction mass when it is prepared. Still another object of this invention is to provide a composition of matter which without separation of compounds therefrom can be subjected to polymerization to produce high molecular weight p-benzamide polymers. This and other objects will be apparent from the description of the invention herein.

SUMMARY OF THE INVENTION

In accordance with this invention, novel compositions are provided which are useful for preparing high molecular weight p-benzamide polymers and especially dopes thereof. These compositions are easily obtained from readily available p-aminobenzoic acid by a catalytic process which eliminates cumbersome procedures of the prior art.

Thus the invention provides a composition consisting essentially of compounds and mixtures of the formula:

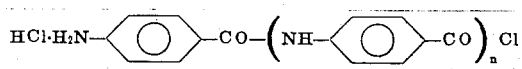

where $n$ is an integer of 1–50, with the hydrochloride of a nitrogen base compound selected from the group consisting of a tertiary $C_1$–$C_4$ alkyl amine, a heterocyclic tertiary amine, an N-$C_1$–$C_4$ alkyl substituted amide of an organic carboxylic acid having at least two carbon atoms and generally no more than seven, an N-$C_1$–$C_4$ substituted lactam of an omega-amino group containing four to six carbon atoms, tetramethylurea and hexamethylphosphoramide, said compounds and mixtures are used directly without separation of components to prepare high molecular weight p-benzamide polymers. These polymerizable substances are designated herein as the dimer of p-aminobenzoyl chloride hydrochloride, or 4-(4'-aminobenzamido)benzoyl chloride hydrochloride, where $n$ is 1, and oligomers of p-aminobenzoyl chloride hydrochloride, when $n$ is 2–50. This composition can be used directly to prepare p-benzamide polymers without preliminary separation of the active polymerizable substance from the base hydrochloride.

There are two unexpected advantages of the novel composition of the invention. One is that in its preparation the mixture is easily filterable from the reaction mass, while the p-aminobenzamido benzoyl chloride hydrochlorides alone in their preparation are formed in such a finely divided state that separation from the reaction mass is difficult. Another advantage is that this mixture can be readily subjected to polymerization without separation, the base hydrochloride providing a beneficial effect of forming HCl during polymerization, and which when subsequently neutralized, e.g., with a lithium base compound, forms lithium chloride, a compound capable of imparting greater fluidity to the spin dope.

More particularly, the invention provides a composition consisting essentially of a mixture of the hydrochloride of a nitrogen base compound selected from the group consisting of a tertiary $C_1$–$C_4$ alkyl amine, a heterocyclic tertiary amine, an N-$C_1$–$C_4$ alkyl substituted amide of an organic carboxylic acid having at least two carbon atoms and generally no more than seven, an N-$C_1$–$C_4$ substituted lactam of an omega-amino acid containing four to six carbon atoms, tetramethylurea and hexamethylphosphoramide with a compound or mixtures of compounds of the formula:

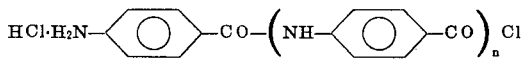

where $n$ is 1–50, preferably 1–20.

More specifically, the mixture consists essentially of the base hydrochloride and polymerizable substance in the proportion of 0.1 to 2 moles of base hydrochloride per each mole of benzene residue contained in the polymerizable substance, preferably 0.5 to 1 mole of base hydrochloride based on each mole of benzene residue in the polymerizable substance.

For example, the base hydrochloride is present in the range of 0.2 to 4 moles, preferably 1 to 2 moles, per mole of 4-(4'-aminobenzamido)benzoyl chloride, the dimer, where n is 1 in the above formula.

In the case of mixtures of base hydrochloride with oligomer, the oligomer can be considered as having an average of 3–51 benzene residues in the molecule, preferably 3–21.

The composition may also be defined in terms of equivalents, that is, the mixture consists of 0.1 to 2.0 equivalents, preferably 0.5 to 1, of base hydrochloride per equivalent of polymerizable substance.

To provide an understanding of the terms used in this specification, an explanation by way of definitions is included with the intent that, wherever the terms appear, they are to be construed in accordance with such definitions.

The term dimer as used hereinafter refers to the dimer of p-aminobenzoyl chloride hydrochloride which is defined as the compound, 4-(4'-aminobenzamido)benzoyl chloride hydrochloride. The term dimer is also defined as the compound of the formula:

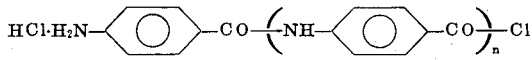

where $n = 1$.

The term oligomers as used hereinafter refers to oligomers of p-aminobenzoyl chloride hydrochloride which is defined by the formula:

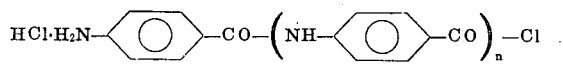

wherein $n$ is 2–50, considered as having an average of preferably 3–21 benzene residues in the molecule.

The term solvent is defined as a liquid capable of dissolving the hydrochloride of the base compound, but which is not a solvent for the dimer or oligomer.

The term non-solvent is defined as a liquid in which the hydrochloride of the base compound, dimer and oligomer are essentially insoluble.

The composition of the invention is readily and directly obtained by reacting one mole of p-aminobenzoic acid or its hydrochloride with 1-2 moles of thionyl chloride in the presence of 0.1 to 3 moles of a nitrogen containing base compound selected from the group consisting of a tertiary $C_1$–$C_4$ alkyl amine, a heterocyclic tertiary amine, an N-$C_1$–$C_4$ alkyl substituted amide of an organic carboxylic acid having at least two carbon atoms and generally not more than seven, an N-$C_1$–$C_4$ substituted lactam of an omega amino acid containing four to six carbon atoms, tetramethyl urea, hexamethylphosphoramide and the hydrochloride of any thereof, at a temperature of about −10° to 95°C.

Representative examples of the base compound are the tri(lower alkyl)amines such as trimethylamine, triethylamine, tripropylamine and tributylamine; heterocyclic tertiary amines such as pyridine, α-picoline, γ-picoline and N-methyl piperidine; N-$C_1$–$C_4$ alkyl substituted amide of an organic carboxylic acid having at least two carbon atoms and generally not more than seven, such as N-methylacetamide, N,N-dimethylacetamide, N,N-diethylacetamide, N,N-dipropylacetamide, N,N-dibutylacetamide, the N,N-di-$C_1$–$C_4$ alkyl propionamides, N,N-di-$C_1$–$C_4$ alkyl butyramides, and the N,N-di-$C_1$–$C_4$ alkyl benzamides; the N,N-di-$C_1$–$C_4$ substituted lactams of an omega amino acid containing four to six carbon atoms such as N-methyl pyrrolidone-2, N-ethyl pyrrolidone-2, N-propyl pyrrolidone-2, N-methyl piperidone-2 and N-methyl caprolactam; tetramethyl urea; hexamethylphosphoramide; and the hydrochloride of any thereof.

The role of the organic nitrogen containing base compound (also referred to as the base compound) is that of a catalyst. As little as a trace amount per mole of p-aminobenzoic acid is sufficient to overcome the disadvantages of conducting the reaction without a catalyst. The base compound or catalyst also functions as an acid acceptor. Accordingly, since hydrogen chloride is a product of the reaction, the base compound forms the hydrochloride of the base compound. However, the hydrochloride of the base compound may also be used in place of the base compound itself in the reaction. The base compound, though it is an acid acceptor, functions as a catalyst. Thus, the use of the hydrochloride of the base compound initially in place of the base compound itself is within the scope of this invention and will produce the dimer and/or oligomers.

When 1 to 1.2 moles of thionyl chloride are reacted with one mole of p-aminobenzoic acid in the presence of one mole or less of the base compound at a temperature of from about −10° to 50°C., essentially 4-(4'-aminobenzamido)-benzoyl chloride hydrochloride is produced. However, when the temperature is subsequently increased to a range of from about 50° to 95°C., essentially oligomers of p-aminobenzoyl chloride hydrochloride are produced.

Reacting 1 to 1.2 moles of thionyl chloride with one mole of p-aminobenzoic acid in the presence of 1 to 2 moles of the base compound at a temperature of from about −10°C. to about 50°C., results in the production of a mixture of dimer and oligomers. However, when the temperature is subsequently increased to the range of from about 50°C. to about 95°C., essentially oligomers are produced.

When 1 to 1.2 moles of thionyl chloride are reacted with one mole of p-aminobenzoic acid in the presence of 2 to 3 moles of the base compound at a temperature of from about −10°C. to about 50°C., essentially oligomers are produced.

The preparation of the dimer and/or oligomers may be conducted in the absence of a solvent or non-solvent medium, in the presence of a solvent or in the presence of a non-solvent medium as hereinafter described.

Maximum concentration and contact between reactants is achieved by carrying out the reaction in the absence of a solvent or non-solvent. Such reactions in order to be effective require sufficient and adequate agitation to achieve thorough mixing and contact between the reactants. Sulfur dioxide which is generated as a by-product in the reaction imparts some mobility to the reaction mass. In some cases, in order to enhance the fluidity of the reaction mass, more $SO_2$ may be added. The $SO_2$ is removed by evaporation at the end of the reaction. The dimer-oligomer mixture is thus obtained in admixture with the base hydrochloride as a dry, free flowing powder. This composition can then be advantageously used to prepare polymers directly without separation of the dimer and/or oligomer from the base hydrochloride.

When the preparation of the dimer and/or oligomer is carried out in the presence of a solvent, the active polymerizable compound is obtained in admixture with the base hydrochloride by evaporation of the solvent. Alternatively, the dimer and/or oligomer is obtained in admixture with the base hydrochloride by adding a non-solvent to the reaction mass containing a solvent as the liquid medium. This causes the base hydrochloride to precipitate with the dimer and/or oligomer.

When the preparation of the dimer and/or oligomer is carried out in the presence of a non-solvent, the product is recovered from the reaction mass by filtration or evaporation of the non-solvent and the product obtained is in admixture with the base hydrochloride. If it is desired to separate the polymerizable product from the base hydrochloride, a solvent is added to the polymerizable product in admixture with the base hydrochloride and the dimer and/or oligomer is recovered by filtration.

In cases when a non-solvent is added to a solvent medium, or when an entirely non-solvent medium is employed, the product obtained is a mixture of the active polymerizable dimer and/or oligomer with the base hydrochloride. It has been found that such a mixture has the unexpected property of being easily filterable, while the dimer and/or oligomer alone is in too fine a dispersion or suspension to be readily separated from the reaction mass. In addition, this mixture affords the advantage of introducing HCl into the polymerization mass (as the base hydrochloride) which when subsequently neutralized with a base, e.g., lithium base, forms lithium chloride, which, in turn as stated hereinafter, imparts greater fluidity to the spin dope.

The amount of solvent or non-solvent used to create a liquid medium for the reaction is that amount that will provide an easily stirrable reaction mass. Generally, amounts of up to one liter per mole of p-aminobenzoic acid are sufficient. More than about one liter results in a decrease in reaction rate.

Representative examples of non-solvents include aliphatic and aromatic hydrocarbons such as hexane, benzene and toluene; halogenated hydrocarbons such as carbon tetrachloride, chlorinated benzene, chlorinated toluene, trichlorofluoromethane, 1,1,2-trichlorotrifluoroethane, 1,2-dichlorotetrafluoroethane, and dichlorofluoromethane; ethers such as glyme ($CH_3OCH_2CH_2OCH_3$), tetraglyme [$CH_3O(CH_2CH_2O)4CH_3$], diethylether, tetrahydrofuran and dioxane; sulfones such as tetramethylene sulfone; and esters such as ethyl acetate, propyl acetate and butyl acetate.

Representative examples of solvents include methylene chloride, chloroform, acetonitrile and sulfur dioxide.

The reaction temperature ranges from about −10°C. to about 95°C., depending upon the product desired. The reaction to produce dimer is carried out at a temperature from about −10°C. to about 50°C. The reactions that produce essentially oligomer and mixtures of dimer and oligomer are carried out at a temperature of from about −10°C. to about 95°C. The preparation of essentially oligomer may be achieved at a temperature from about −10°C. to about 50°C. when additional base compound is added.

The reaction time varies from 1 to 20 hours, depending upon many factors, such as the temperature after addition, presence or absence of a solvent or non-solvent and the product desired. Generally, in reactions with a non-solvent or in reactions without a liquid medium, the reaction time is short, about 1 hour. This is due primarily to the high concentration of reactants. In the event a solvent is used, the concentration of the reactants and catalyst is lowered and thus the overall rate is retarded.

The reaction rates and overall reaction time are easily determined by following the rates of disappearance of p-aminobenzoic acid and appearance of the product by employing infrared spectroscopy.

The process for dimer and/or oligomer can be conducted batch-wise or in a continuous manner.

If operated on a continuous basis, the reactants, p-aminobenzoic acid, thionyl chloride and base compound, are fed continuously into a stirred tank at a temperature below about 5°C. The reaction mass overflows into another tank maintained at a temperature of about 5° to 95°C., depending on the product desired. After completion of reaction, the reaction mass is spray dried to remove by-product sulfur dioxide. The reaction mass contains dimer and/or oligomer, depending upon the reaction conditions, in admixture with the base hydrochloride. The product in admixture with the base hydrochloride can then be polymerized as described herein.

In general, regardless of the exact procedure by which the composition of the invention is obtained, and after removal of by-product sulfur dioxide, the product mixture can be used directly to prepare spin dopes of p-benzamide polymers. A polymerization solvent is added directly to the mixture of base hydrochloride and dimer and/or oligomer, a neutralization agent added and polymerization is effected.

The polymerization solvents are not the solvents cited hereinbefore. The polymerization solvents may include some compounds cited herein before as base compounds.

Representative examples of the polymerization solvents of this invention include N,N,N',N'-tetramethylurea; 1,3-dimethylimidazolidinone-2; N-methylpiperidone-2; N-methylcaprolactam; N,N-dimethylacetamide; N,N-dimethylpropionamide; N,N-dimethylbutyramide, N,N-dimethylisobutyramide; N,N-diethylacetamide; hexamethylphosphoramide; N-methylpyrrolidone-2; N-ethylpyrrolidone-2; N,N,N',N'-tetramethylmalonamide; and the like, or mixtures thereof.

Representative examples of neutralization agents include the alkali metal and alkaline earth metal hydroxides, oxides, carbonates and hydrides, as well as aqueous ammonium hydroxide. Preferably, a lithium base neutralizing agent such as lithium carbonate, lithium hydroxide, lithium oxide or calcium hydroxide is added to the reaction mixture in the amount necessary to effect neutralization of the acidic by-product. This neutralization is highly desirable for several reasons. Firstly, the acid may cause significant corrosion problems in processing equipment (e.g., the spinneret). Secondly, it is seen that the presence of acid may inhibit formation of higher molecular weight polymer (e.g., inherent viscosity greater than about 1.4 to 2.0). When a lithium base neutralization agent is used, lithium chloride is formed which with the solvent solubilizes the polymer and permits the formation of a spin dope solution of the polymer.

The reaction mixture preferably will contain from 1 to 10 percent dissolved lithium chloride with 1 to 4 percent being most preferred.

When compounds such as tetramethylurea, N,N-dimethylacetamide, N,N-dimethylisobutyramide, or 1,3-dimethylimidazolidinone-2, are employed in the polymerization, the contents of the reaction vessel are obtained in the form of a viscous dope which can be directly formed into shaped articles (e.g., extruded into fibers or cast into films). Under these conditions, use of calcium hydroxide as a neutralizing agent is limited to N,N-dimethylacetamide dopes. It is generally preferred to further stir the contents of the reaction vessel, after neutralization, for about 0.5 to 2 hours, at from 45° to 170°C., when the polymerization solvent is tetramethylurea. When the polymerization solvent is 1,3-dimethylimidazolidinone-2, N,N-dimethylisobutyramide or N,N-dimethylacetamide, it is preferred to further stir the reaction mixture after neutralization for about 1 hour at about 100° to 110°C.

The dopes of the p-benzamide polymers obtained can be cast into self-supporting films, extruded into fibers by conventional means or formed in fibrids by shear precipitation techniques. They can also be used as liquid coating compositions which are applied to various substrates.

The following examples illustrate the preparation and use of the compositions of the invention. In these examples inherent viscosity (Ninh) is defined by the following equation:

$$\text{Ninh} = [\ln (N_{rel})/C]$$

wherein ($N_{rel}$) represents the relative viscosity, (C) represents a concentration of 0.5 g. of the polymer in 100 ml. of solvent. The relative viscosity ($N_{rel}$) is determined by dividing the flow time in a capillary viscometer of a dilute solution of the polymer by the flow time for the pure solvent. The dilute solution used herein for determining ($N_{rel}$) is of the concentration expressed by (C) above; flow times are determined at 30° C., using concentrated (95–98 percent) sulfuric acid as solvent.

An inherent viscosity of about 0.6 is desirable for casting films and coating compositions, and slightly higher for spin dopes.

Fiber properties of tenacity, elongation and initial modulus are coded as $T/E/M_i$ and are in units of grams/denier, percent and grams/denier, respectively. Parts and percentages are by weight unless otherwise indicated except for percent oligomer which is expressed in equivalent percent of the polymerizable portion of the composition.

The equivalent percent of active oligomer is determined by a calibrated infrared spectral method. The oligomeric product has a characteristic absorption at 760 cm$^{-1}$ while the dimeric product has a characteristic absorption at 735 cm$^{-1}$. A sample of the product mixture is carefully washed free of the base hydrochloride using methylene chloride. The sample is then mulled in nujol and the spectrum is taken. The equivalent percent of active oligomer is then calculated using the following equation:

$$\text{Equiv. percent oligomer} = \frac{A_{760 \text{ cm.}^{-1}}}{A_{760 \text{ cm.}^{-1}} + A_{735 \text{ cm.}^{-1}}} \times K \times 100$$

wherein $A_{760}$ cm$^{-1}$ and $A_{735}$ cm$^{-1}$ are the heights of the 760 cm$^{-1}$ absorption and the 735 cm$^{-1}$ absorption measured from the base line. K is a correction factor determined experimentally, which converts the expression to give equivalent percent oligomer. K was determined by preparing mixtures of oligomer and dimer of known composition and running infrared spectra of the mixtures and calculating K as follows:

$$K = \frac{\text{equivalent fraction oligomer}}{\dfrac{A_{760 \text{ cm.}^{-1}}}{A_{760 \text{ cm.}^{-1}} + A_{735 \text{ cm.}^{-1}}}}$$

All infrared spectra were taken on samples prepared in the above manner and thus the samples are free of base hydrochloride unless stated otherwise.

By essentially oligomer is meant having 75 equivalent percent or more oligomer. Essentially dimer is defined as 75 equivalent percent or more of dimer.

Mixtures of dimer and oligomer with the base hydrochloride are also contemplated within the invention.

EXAMPLE 1

Preparation of dimer in admixture with N,N-dimethylacetamide

A slurry of p-aminobenzoic acid (27.4 grams, 0.20 mole) in methylene chloride (50 milliliters) was cooled to −5°C. with stirring, in a round bottom, four-necked flask equipped with stirrer, thermometer, nitrogen inlet and dropping funnel. Thionyl chloride (24.8 grams, 0.208 mole) was added rapidly and anhydrous N,N-dimethylacetamide (17.4 grams, 0.20 mole) was added at −10°C. in 20 minutes The temperature was allowed to rise to 30°–35°C. and stirring was continued for 16 hours. The methylene chloride and sulfur dioxide were removed by rotary evaporation. The solid residue was ground to a powder in a blender in a dry box. The powder was transferred to a polyethylene bottle and placed in a vacuum desiccator maintained at 1 millimeter Hg. pressure for 5 hours. The yield was 52.0 grams. Analysis for weight percent of N,N-dimethylacetamide in the product mixture showed 31.6 average, indicating 23.2 grams N,N-dimethylacetamide hydrochloride, the weight percent HCl being 24.53. the content of the dimer, 4-(4′-aminobenzamido)-benzoyl chloride hydrochloride, in the product was 26.8 grams and oligomer was 1.99 grams.

A 36.2 gram portion of the product mixture obtained above, consisting of dimer, oligomer and N,N-dimethylacetamide hydrochloride was polymerized by adding to 233 millileters of anhydrous N,N-dimethylacetamide previously cooled to −10°C. in a 500 milliliter resin kettle equipped with a drying tube, nitrogen inlet and an air driven stirrer. The temperature of the mixture was allowed to rise to room temperature while stirring, which was continued for 3 hours. The resulting thick paste was cooled in an ice/methanol bath and 8.85 grams of lithium carbonate was added. A clear solution resulted which was stirred overnight at room temperature. A small sample of the solution was drowned in water, collected by filtration and washed well with water. The isolated 1,4-benzamide polymer had an inherent viscosity of 1.81.

EXAMPLE 2

Preparation of dimer-base hydrochloride composition using solvent $CH_2Cl_2$ — Dilution with fluorinated hydrocarbon A 4-liter resin flask equipped with air motor stirrer, condenser, thermometer and nitrogen inlet tube (for maintaining a nitrogen atmosphere over the reaction) was charged with 548 grams. (4.0 moles) of p-aminobenzoic acid and 1,180 milliliters of $CH_2Cl_2$. To this stirred slurry was added 370 milliliters (4.0 moles) of N,N-dimethylacetamide over a period of 2 minutes. The mixture was cooled to 5°C. and 316 milliliters (4.4 moles) of $SOCl_2$ was added over a period of 10 minutes while maintaining the temperature below 25°C. The resulting thick slurry was then heated to 35°C. and stirred at that temperature for 5 hours after which the heat source was removed.

During a 1-minute period, 800 milliliters of 1,1,2-trichlorotrifluoroethane was added to the reaction mixture followed by stirring for 15 minutes. Stirring was stopped for 3 minutes, during which time the solids in the reaction vessel floated to the top of the liquids. Then 1,100 milliliters of the mixed solvents were siphoned from the vessel over a 2-minute period, and 1,000 milliliters of additional 1,1,2-trichlorotrifluoroethane was added with stirring for 10 minutes. During this period the reaction mass (originally of curd-like consistency) broke up into fine solid grains. This solid was collected and dried under $N_2$ pressure overnight, giving 1,079 gram product consisting of dimer, oligomer and N,N-dimethylacetamide hydrochloride in a 96.9 percent yield. Analysis of the product showed 25.48 weight percent HCl, indicating about 1 equivalent of N,N-dimethylacetamide hydrochloride per equivalent of polymerizable product. IR analysis of the polymerizable portion of the product indicated 9 percent oligomer, the remainder being dimer.

EXAMPLE 3

Preparation of dimer-base hydrochloride composition using non-solvent, hexane

A mixture of 54.8 grams (0.40 mole) p-aminobenzoic acid and 200 milliliters hexane was stirred in a round bottom, four-necked flask equipped with stirrer, thermometer, nitrogen inlet and dropping funnel, and cooled under a nitrogen cover. Dry N,N-dimethylacetamide (34.8 grams, 0.40 mole) was added and the slurry was cooled to −2°C. Thionyl chloride (49.8 grams, 0.41 mole) was added over 10 minutes, causing the temperature to rise to 14°C. The temperature was increased to 33°C. in 27 minutes and held at this temperature for 50 minutes. During this time the slurry had coagulated into a gummy mass and the temperature was increased to 50°C. This caused rapid gas evolution and the mass broke up into small hard fragments. The reaction mixture was cooled to 25°C., the product collected by filtration, washed with dry ether and dried with a nitrogen stream. The product, 105.6 grams, (0.384 equivalent, 95.9 percent based on an equivalent weight of 275.3 grams/equivalent) consisted of 47.4 grams N,N-dimethylacetamide hydrochloride, 52.0 grams 4-(4′-aminobenzamido)benzoyl chloride hydrochloride and 6.2 grams oligomer.

A sample of the mixture of essentially 4-(4′-aminobenzamido)benzoyl chloride, oligomer and N,N-dimethylacetamide hydrochloride (1:1 equivalent ratio of polymerizable product to base hydrochloride) was polymerized in N,N-dimethylacetamide as described in Example 1. The polymer obtained had an inherent viscosity of 1.68.

EXAMPLE 4

Preparation of dimer-base hydrochloride composition using no solvent 13.7 grams of p-aminobenzoic acid (0.10 mole) and 13.1 grams of thionyl chloride (0.11 mole) were combined in a round bottom, four-necked flask equipped with thermometer, stirrer, nitrogen inlet and dropping funnel. The temperature rose to 30°C. and the originally dry mixture became a thick but stirrable slurry. The temperature was lowered to −5°C. and 8.7 grams (0.1 mole) of N,N-dimethylacetamide was added in 6 minutes below 8°C. The temperature was allowed to rise to 31°C. and the slurry became easily stirrable. By maintaining the temperature at 30°C. for 30 minutes, the reaction was completed. The reaction mass was maintained at 27°–30°C. for another 30 minutes, then swept with nitrogen for 2 hours. The yield was 24.9 grams (90.6 percent *((based based on an equivalent weight of 274.9 grams/equivalent)) consisting of dimer 12.1 grams, oligomer 1.62 grams and N,N-dimethylacetamide hydrochloride 11.18 grams in a molar ratio of 1:2 of polymerizable substance: base hydrochloride.

The product of the above Example 4, (having an equivalent ratio of polymerizable product to DMAc·HCl of 1:1) was polymerized according to the procedure in Example 1. The polymer had an inherent viscosity of 1.58.

EXAMPLE 5

Preparation of dimer-oligomer-base hydrochloride composition using no solvent, add $SO_2$ To a jacketed resin flask equipped with an agitator, 119.8 grams (1.1 moles) of thionyl chloride was added and cooled to 0°C. N,N-dimethylacetamide, 87 grams (1 mole) was added while maintaining the mixture below 5°C. To this mixture was added 137 grams (1 mole) of p-aminobenzoic acid keeping the temperature below 12°C. The system was maintained at a slight positive pressure (100–300 millimeter Hg. above atmospheric) with nitrogen to prevent loss of $SO_2$ which is formed in the reaction. The mixture was heated slowly to 30°–35°C. and held at this temperature for 15–30 minutes. During this entire time the reaction mass remained in the form of a thin slurry. When the reaction was completed, the product was converted to a dry powder (420 grams) by purging with dry nitrogen. Product contained 186 grams of N,N-dimethylacetamide hydrochloride and the remaining 234 grams consisted of 73 percent dimer and 27 percent oligomer, as determined by IR spectra.

If in the reaction as described above, the reaction mass thickens prematurely, additional $SO_2$ may be added to the reaction mass. By attaching a cooled reflux condenser to the apparatus, the $SO_2$ is condensed and the reaction mass maintained in the form of a thin liquid slurry. Up to 4 additional moles of $SO_2$ may be advantageously added when the temperature is kept at −2°C. or at a higher temperature under pressure. The product is recovered as a dry powder, as described above, by purging the reaction mass with dry nitrogen at a fast rate, or it can be spray dried in conventional spray drying equipment.

EXAMPLE 6

Preparation of a spin dope

A three-necked, 500 milliliter round bottom flask was flame dried and after cooling was fitted with a nitrogen inlet, stirrer and a dropping funnel. p-Aminobenzoic acid, 13.7 grams, 0.10 mole, and thionyl chloride 12.5 grams, 0.105 mole, were combined and stirred in the flask, which was cooled in an ice-acetone bath (−15°C.). A thermometer was fitted into the nitrogen inlet adapter. When the mixture reached −2° C., N,N-dimethylacetamide, 8.7 grams, 0.10 mole, was added dropwise over 8 minutes. The bath was removed and the reaction mixture was allowed to warm to 27°C. and maintained at 27°C. for 1 hour. A sample was removed for IR analysis which showed the reaction was complete, 88.1 equivalent percent dimer and 11.9 equivalent percent oligomer. The product containing dimer, oligomer and N,N-dimethylacetamide hydrochloride was not isolated.

The flask was then sealed and evacuated to 0.2 millimeter Hg. After 1.25 hours the vacuum was released under nitrogen and the flask transferred to a dry box. The dried solids were pulverized under a nitrogen sweep. The reaction was cooled in an ice-acetone bath and 188 grams N,N-dimethylacetamide was added at −10°C. The slurry was allowed to warm to 19°C. over 25 minutes. The reaction mixture was cooled to 7°C. and $Li_2CO_3$ was added in 2 minutes with a temperature rise of 2°. The cooling bath was removed and the temperature allowed to rise to 20°C. over an 18-minute period. The stirring was continued at this temperature for 1 hour and the solution was allowed to stand overnight. The polymer was spun into a fiber having the following characteristics: T/L/M; of 6.1/5.4/394 and 129 denier.

A 20 milliliter sample was withdrawn, drowned in 200 milliliters water and stirred in a blender. After collecting the polymer by filtration, it was reblended twice more with water. The washed polymer was dried in a vacuum oven at 90°C. for 4 hours. The inherent viscosity of the polymer was 1.77.

EXAMPLE 7 p-Aminobenzoic acid hydrochloride as starting material

A mixture of 34.7 grams (0.20 mole) p-aminobenzoic acid hydrochloride, 90 milliliters hexane and 17.4 grams (0.20 mole) N,N-dimethylacetamide was stirred under nitrogen in a round bottom, four-necked flask equipped with thermometer, stirrer, nitrogen inlet and dropping funnel, cooled and 24.4 grams (0.205 mole) thionyl chloride was added, keeping the temperature below 5°C. in 7 minutes. The reaction was slowly warmed to 50°C. and maintained at that temperature for 1.5 hours with stirring. The reaction mixture was cooled and an IR spectra showed the polymerizable portion of the product to be primarily 4-(4'-aminobenzamido)benzoyl chloride hydrochloride (87.2 percent) and a small amount of oligomer (12.8 percent).

EXAMPLE 8

Pyridine as base compound

A composition consisting essentially of 4-(4'-aminobenzamido)benzoyl chloride hydrochloride and pyridine hydrochloride was prepared by substituting pyridine for N,N-dimethylacetamide in Example 1. Accordingly, 54.8 grams (0.40 mole) of p-aminobenzoic acid, 31.6 grams (0.40 mole) of pyridine, 400 milliliters of methylene chloride and 49.0 grams (0.412 mole) of thionyl chloride were combined as in Example 1 and stirred for 22 hours at ambient temperature. The product was collected by filtration, washed with 750 milliliters methylene chloride and dried in a desiccator at 10 millimeters Hg. pressure. The yield of dry product was 72.0 grams (0.169 mole, 84.4 percent), containing 52.5 grams dimer and 19.5 grams pyridine hydrochloride.

Analysis: Calc. for $C_{19}H_{18}N_3O_2Cl_3$ (MW 426.733):
  C, 53.55; H, 4.26; N, 9.85; O, 7.51, Cl, 24.93.
Found: C, 54.08, 54.18; H, 4.24, 4.16; N, 9.66, 9.67; O 7.79, 7.91; Cl, 23.99, 24.11

A portion of this product having a ratio of 1 equivalent of dimer to 0.5 equivalent of pyridine hydrochloride was polymerized essentially as in Example 1. The isolated poly-1,4-benzamide had an inherent viscosity of 1.66.

EXAMPLE 9

Benzene — low temperature 35°C. dimer preparation

A 5-liter flask equipped with mechanical stirrer, dropping funnel, thermometer, reflux condenser and nitrogen inlet was charged with 686 grams (5.0 mole) of p-aminobenzoic acid and 3,250 milliliters of benzene. This stirred slurry was cooled to 5°C. and 218 grams (2.50 moles) of N,N-dimethyl-acetamide was added over a 16-minute period. Then 655 grams (5.50 moles) of $SOCl_2$ was added over a 25-minute period while maintaining the temperature below 10°C.

The cooling bath was removed and the stirred slurry was heated to 35°C. for 1 hour. Then a nitrogen purge was introduced through the reaction flask over the top of the reaction mixture (flow rate ca. 400 cc./min.). Stirring at 35°C. with the nitrogen purge was continued for 16.5 hours (i.e., total reaction time at 35°C. was 17.5 hours). The heat source was removed; the product was collected and dried under nitrogen pressure overnight, giving 1,016 grams, 94.6 percent yield of theoretical. This product was 677.0 grams dimer, 46.7 grams oligomer and 292.0 grams N,N-dimethylacetamide hydrochloride.

The product having a ratio of 1 equivalent of polymerizable product to 0.5 equivalent of DMAcHCl was polymerized as in Example 1 to give a polymer having an inherent viscosity of 5.73.

EXAMPLE 10

Preparation using a ratio of 1:1.05:0.8 of p-aminobenzoic acid:$SOCl_2$:DMAc 137.1 grams of p-aminobenzoic acid (1.00 mole) and 125.0 grams of thionylchloride (1.05 mole) was combined in a round bottom, four-necked flask equipped with thermometer, stirrer, nitrogen inlet and dropping funnel. The mixture was cooled in an acetone/ice bath and 69.7 grams N,N-dimethylacetamide (0.80 mole) was added over 45 minutes. The cooling bath was then removed and the temperature was allowed to rise to ambient over the next 30 minutes. 3.6 grams of hydrogen chloride (0.10 mole) was then added and the reaction mass was stirred at ambient temperature for 3 hours. An infrared spectrum taken during this period indicated the reaction was not complete. The reaction mass was extremely viscous and was thinned out by saturating the mass with sulfur dioxide at 0°C. The reaction mass was allowed to return to ambient temperature and then stirred overnight. The reaction mixture was then stripped of volatile components by applying a vacuum of 0.25 millimeter Hg. for 2 hours. The vacuum was released under nitrogen. The solids were pulverized and placed under high vacuum for an additional 2 hours. The yield was 238.2 grams, 95.2 percent consisting of 126.7 grams dimer, 17.2 grams oligomer and 94.3 grams N,N-dimethylacetamide hydrochloride.

The product had a ratio of 1 equivalent of polymerizable product to 0.8 equivalent of DMAc·HCl and polymerized to give a polymer with inherent viscosity of 2.90 and fiber spun had T/E/Mi of 5.2/5.6/257.

EXAMPLE 11

Preparation using a ratio of 1:1.05:0.9 of p-aminobenzoic acid $SOCl_2$:DMAc 137.1 grams of p-aminobenzoic acid (1.00 mole), 125.0 grams of thionyl chloride (1.05 moles) and 78.4 grams of N,N-dimethylacetamide (0.90 mole) were combined and treated as in Example 10. The use of sulfur dioxide to thin out the reaction mass however was not required. The reaction was finished after 3 hours of stirring at ambient temperature. The yield of dried reaction mixture was 261.8 grams, 96.2 percent consisting of 124.3 grams dimer, 20.5 grams oligomer and 107.0 grams N,N-dimethylacetamide hydrochloride.

The product mixture having a ratio of 1 equivalent of polymerizable product to 0.9 equivalent of DAMc·HCl polymerized to give a polymer with inherent viscosity of 3.67.

EXAMPLE 12

Oligomer preparation

A slurry of 27.4 grams (0.20 mole) of p-aminobenzoic acid and 17.4 grams (0.20 mole) of N,N-dimethylacetamide in 130 milliliters benzene was stirred and cooled under nitrogen to 5°C. Thionyl chloride (24.4 grams, 0.205 mole) was added which raised the temperature from 5° to 24°C. The temperature was raised to 70°C. in 33 minutes and after heating at 70°C. for a total of 50 minutes an examination by IR of the solids washed free of N,N-dimethylacetamide hydrochloride showed essentially oligomeric material. The mixture was cooled, filtered and the cake dried. The yield obtained was 47.9 grams, 0.197 equivalent, 95.7 percent yield, consisting of 24.20 grams oligomer and 23.70 grams N,N-dimethylacetamide hydrochloride.

A sample of the product having a ratio of 1 equivalent of polymerizable product to 1 equivalent of DMAc·HCl was polymerized to give a polymer having an inherent viscosity of 1.90. Fibers spun from the resulting polymer had the following properties: T, 9.1; E, 5.1, $M_i$, 565.

EXAMPLES 13-24

The procedure of Example 1 was followed with the following table showing the details of the reactants and the products formed.

TABLE I

Reaction products of 1 mole p-aminobenzoic acid; 1 mole thionyl chloride*:base

| Exp. No. | Base | Mole | Medium/ml. | Reaction time,ᵃ °C. | Reaction time, hr. | Rx scaleʲ | Yield,ᵇ g. | Yield,ᶜ percent | Equiv.ᵈ weight | Product composition Dimer | Product composition Oligomer G./equiv. | Product composition Base·HCl | Equiv. ratio Base·HCl/ polymerizable product | Inherent viscosity of polymer |
|---|---|---|---|---|---|---|---|---|---|---|---|---|---|---|
| 13 | Dimethylacetamide | 1 | CCl₂FCClF₂/437 | 25–37 | 20 | 1.6 | 421.0 | 97.5 | 269.7 | 164.8 1.059 | 63.4 0.501 | 192.8 1.560 | 1.00 | 0.97 |
|  | ....do.......... | 0.5 | Benzene/650 | 55 | 2.5 | 5.0 | 1058.0 | 99.9 | 212.0 | 660.0 4.25 | 91.7 0.725 | 306.3 2.487 | 0.50 | 2.84 |
| 14 | Triethylamine | 1 | CH₂Cl₂/500 | 25–30 | 21 | 0.4 | (ᵉ) | (ᵉ) |  |  | (ᶠ) |  |  |  |
| 15 | Hexamethylphosphoramide | 1 | CH₂Cl₂/250 | 25–30 | 3 | 0.2 | 65.5 | 89.1 | 367.4 | 24.1 0.155 | 2.93 0.023 | 38.4 0.178 | 1.00 | 0.70 |
| 16 | Tetramethylurea | 1 | CH₂Cl₂/250 | 25–30 | 3 | 0.2 | 45.2 | 74.4 | 303.7 | 20.6 0.132 | 2.09 0.0165 | 22.54 0.1488 | 1.00 | 1.49 |
| 17 | γ-Picoline | 0.5 | Benzene/650 | 56–60 | 5 | 1.0 | 220 | 90.3 |  |  | (ᵉ) |  | 0.50 | 2.61 |
| 18 | N-methyl caprolactam | 0.5 | ....do........ | 60 | 3 | 2.0 | 419 | 88.2 |  |  | (ᵉ) |  | 0.50 | 1.69 |
| 19 |  |  |  |  |  |  |  |  |  |  |  |  | 0.50 | ʰ1.88 |
| 20 | α-Picoline | 0.5 | ....do........ | 75 | 1 | 1.0 | (ᵉ) | (ᵉ) | 262.5 | 20.0 0.129 | 0.89 0.007 | 14.75 0.136 | 1.00 | 1.27 |
| 21 | N-methylacetamide | 1 | CH₂Cl₂/650 | 25–30 | 24 | 0.2 | 35.7 | 68.0 | 270.1 | 18.97 0.122 | 7.0 0.055 | 21.9 0.177 | 1.00 | 1.28 |
| 22 | Dimethylacetamide | 1 | CH₂Cl₂/650 | 30–40 | 24 | 0.2 | 47.9 | 88.6 | 293.0 | 29.2 0.187 |  | 25.6 0.187 | 1.00 | 2.35 |
| 23 | N-methylpyrrolidone-2 | 1 | CH₂Cl₂/650 | 25–30 | 20 | 0.2 | 54.8 | 93.6 |  | 13.5 |  | 218.0 | 1.00 | 2.03 |
| 24 | Dimethylacetamide | 1.95 | Benzene/650 | 55–65 | 3 | 1.0 | 328.3 | 94.0 | 370.2 | 0.087 | 101.2 0.800 | 1.730 | 19.5 | (ⁱ) |

ᵃ Addition of reagents normally carried out at about 10° C.
ᵇ Includes polymerizable product plus base·HCl.
ᶜ Yield of polymerizable product.
ᵈ Calculated on the basis of a decamer, equiv. wt. 126.5 g./equiv.
ᵉ Not available.
ᶠ 24% oligomer as determined by I.R. spectra.
ᵍ 21.5% oligomer as determined by I.R. spectra.
ʰ Two fractions obtained on polymerization.
ⁱ Not determined.
ʲ Rx scale—Based on moles of p-aminobenzoic acid actually used.
* A slight excess varying from 2–10% was used.

The foregoing detailed description has been given for clarity of understanding only and no unnecessary limitations are to be understood therefrom. The invention is not limited to exact details shown and described for obvious modifications will occur to one skilled in the art

What is claimed is:

1. The solid mixture consisting essentially of the compound of the formula

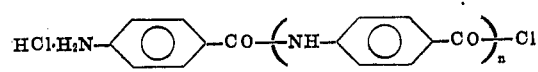

wherein $n$ is an integer of 1 to 50 and 0.1 to 2 moles, per mole of benzene residue in the compound of said formula, of the hydrochloride of the nitrogen base compound selected from the group consisting of a tertiary $C_{1-4}$ alkyl amine, a heterocyclic tertiary amine, an N-($C_{1-4}$ alkyl)substituted amide of an organic carboxylic acid having at least two carbon atoms and generally not more than seven carbon atoms, an N-($C_{1-4}$ alkyl)substituted lactam of an omega-amino acid containing four to six carbon atoms, tetramethylurea and hexamethylphosphoramide.

2. The mixture of claim 1 wherein $n$ is 1.

3. The mixture of claim 1 wherein there is at least 75 equivalent percent of the compound of said formula wherein $n$ is 1.

4. The mixture of claim 1 wherein $n$ is 2 to 50.

5. The mixture of claim 1 wherein there is at least 75 equivalent percent of the compound of said formula wherein $n$ is 2 to 50.

6. The mixture of claim 1 wherein $n$ is 2 to 20.

7. The mixture of claim 2 wherein the nitrogen base compound is N,N-dimethylacetamide.

8. The mixture of claim 2 wherein the nitrogen base compound is pyridine.

9. The mixture of claim 4 wherein the nitrogen base compound is N,N-dimethylacetamide.

10. The mixture of claim 6 containing 0.5 to 1 mole, per mole of benzene residue in the compound of said formula, of the hydrochloride of N,N-dimethylacetamide.

* * * * *

Disclaimer 3,719,642.—*Thomas Albert Johnson*, Newark, Del. INTERMEDIATES FOR P-BENZAMIDE POLYMERS. Patent dated Mar. 6, 1973. Disclaimer filed July 12, 1972, by the assignee, *E. I. du Pont de Nemours and Company*.

Hereby disclaims the portion of the term of the patent subsequent to Oct. 17, 1989.

[*Official Gazette October 16, 1973.*]